United States Patent
Filipovic et al.

(10) Patent No.: US 7,912,438 B2
(45) Date of Patent: Mar. 22, 2011

(54) METHOD AND APPARATUS FOR MITIGATING PHASE NOISE

(75) Inventors: Daniel F. Filipovic, Solana Beach, CA (US); Charles J. Persico, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1025 days.

(21) Appl. No.: 11/688,314

(22) Filed: Mar. 20, 2007

(65) Prior Publication Data

US 2008/0232611 A1 Sep. 25, 2008

(51) Int. Cl.
*H04B 1/10* (2006.01)
*H04B 17/00* (2006.01)

(52) U.S. Cl. ........................ 455/310; 455/63.1; 455/67.13

(58) Field of Classification Search ............... 455/67.11, 455/67.13, 67.16, 114.2, 114.3, 277.2, 278.1, 455/283, 310, 63.1; 375/362, 371, 373, 376
See application file for complete search history.

(56) References Cited

U.S. PATENT DOCUMENTS

| | | | | |
|---|---|---|---|---|
| 6,549,561 | B2* | 4/2003 | Crawford | 375/137 |
| 6,714,072 | B2* | 3/2004 | Kenington | 330/149 |
| 7,551,677 | B2* | 6/2009 | Crawford | 375/260 |
| 2007/0086533 | A1* | 4/2007 | Lindh | 375/260 |

* cited by examiner

*Primary Examiner* — Sonny Trinh
(74) *Attorney, Agent, or Firm* — Jiayu Xu

(57) ABSTRACT

Techniques for mitigating additional phase noise in local oscillator (LO) signals, which may be due to digital noise coupling, are described. A correction signal having an estimate of additional phase noise in an LO signal is derived. The correction signal is applied to a data signal either after downconversion or before upconversion with the LO signal to mitigate the additional phase noise. To derive the correction signal, an input signal having the additional phase noise may be obtained by downconverting a replica LO signal or based on the replica LO signal without downconversion. The input signal may be digitized and filtered to pass a single tone and suppress remaining tones. A replica signal may be derived based on the filtered signal and frequency translated to obtain a phase noise estimate signal at DC. The complex conjugate of the phase noise estimate signal may be provided as the correction signal.

27 Claims, 8 Drawing Sheets

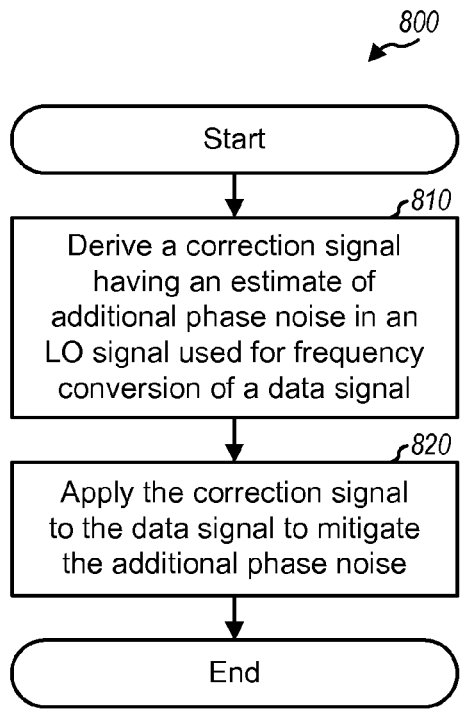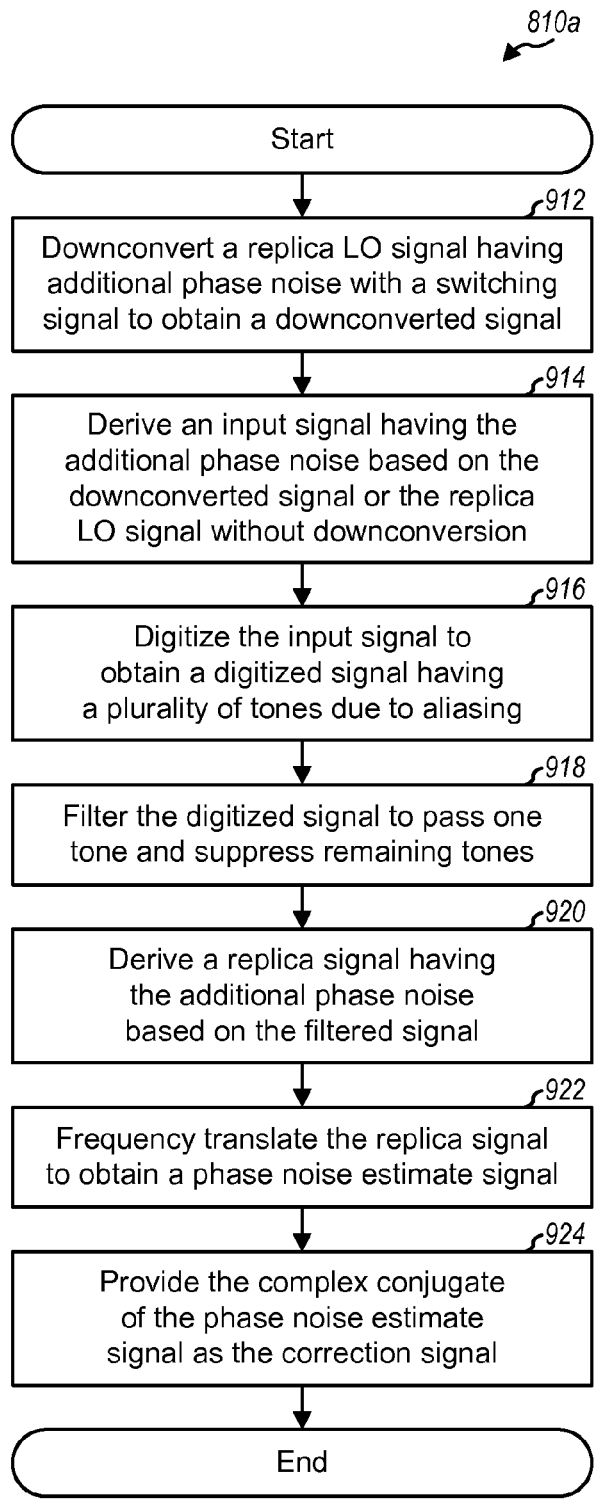

METHOD AND APPARATUS FOR MITIGATING PHASE NOISE

BACKGROUND

I. Field

The present disclosure relates generally to electronics, and more specifically to techniques for mitigating phase noise.

II. Background

A device (e.g., a cellular phone) may employ a combination of digital and analog circuitry to obtain the desired functionality. The digital circuitry may perform various types of signal processing and may be efficiently fabricated on an integrated circuit (IC). The digital circuitry typically generates a large amount of digital noise due to switching of transistors within the digital circuitry. The analog circuitry may generate and/or process analog signals exchanged with other stations. The analog circuitry typically relies on an environment with as little digital noise as possible in order to achieve good performance. The device may be implemented such that a fair amount of digital noise may be coupled to the analog circuitry. The digital noise may degrade the operation of the analog circuitry, e.g., may introduce additional phase noise in local oscillator (LO) signals used for frequency downconversion and/or upconversion. It is desirable to mitigate the additional phase noise in such an implementation.

SUMMARY

Techniques for mitigating additional phase noise in LO signals, which may be due to digital noise coupling, are described herein. The techniques may be used for receivers and transmitters and also for various devices and systems.

In an aspect, a correction signal having an estimate of additional phase noise in an LO signal used for frequency conversion of a data signal is derived. The correction signal is applied to the data signal either after downconversion with the LO signal or before upconversion with the LO signal to mitigate the additional phase noise.

In one design for deriving the correction signal, an input signal having the additional phase noise may be obtained by downconverting a replica LO signal with a switching signal or based on the replica LO signal without downconversion. The input signal may be digitized to obtain a digitized signal having a plurality of tones due to aliasing from the digitization. The digitized signal may be filtered to pass one of the tones and to suppress the remaining tones. A replica signal having the additional phase noise may be derived based on (e.g., by delaying) the filtered signal. The replica signal may be frequency translated to obtain a phase noise estimate signal at direct current (DC). The complex conjugate of the phase noise estimate signal may then be provided as the correction signal.

Various aspects and features of the disclosure are described in further detail below.

BRIEF DESCRIPTION OF THE DRAWINGS

FIG. 8 shows a process for mitigating additional phase noise.

FIG. 9 shows a process for deriving a correction signal used for phase noise mitigation.

DETAILED DESCRIPTION

The phase noise mitigation techniques described herein may be used for various devices that include a combination of digital and analog circuitry. For example, the techniques may be used for communication devices, computing devices (e.g., laptop computers), personal electronics devices (e.g., video game consoles), networking devices, etc. For clarity, certain aspects of the techniques are described below for a wireless communication device, which may be a cellular phone, a personal digital assistant (PDA), a handheld device, a wireless modem, a cordless phone, etc.

Figure 1A:
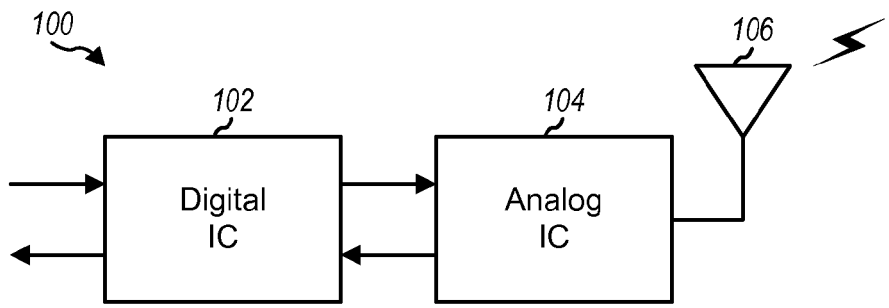
FIGS. 1A, 1B and IC show different levels of circuit integration.

FIG. 1A shows a block diagram of a wireless device 100, which may be a cellular phone or some other device. Wireless device 100 includes a digital IC 102 coupled to an analog IC 104. Digital IC 102 includes digital circuitry (e.g., processors, memories, etc.) that processes digital input data to generate an analog output signal and further processes an analog input signal to obtain digital output data. Analog IC 104 processes the analog output signal from digital IC 102 to generate a transmit radio frequency (RF) signal, which is transmitted via an antenna 106. Analog IC 104 further processes a received RF signal and provides the analog input signal to digital IC 102. Digital IC 102 may generate a large amount of digital noise due to switching of transistors within the digital IC. Analog IC 104 may be separated or isolated from digital IC 102 such that only a small amount of digital noise is coupled to the analog IC. This may then reduce or avoid degradation in performance of analog IC 104.

Figure 1B:
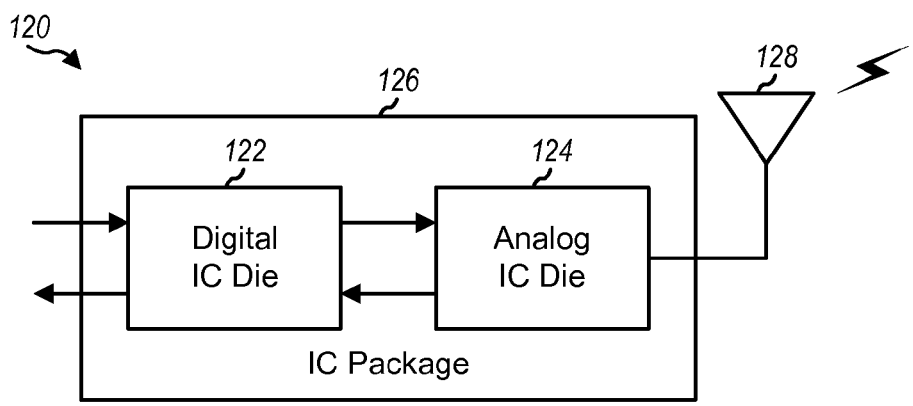

FIG. 1B shows a block diagram of a wireless device 120 with a digital IC die 122 and an analog IC die 124 integrated on a single IC package 126 and coupled to an antenna 128. Digital IC die 122 may include digital circuitry that performs the digital processing described above for FIG. 1A. Analog IC die 124 may include analog circuitry that performs the analog processing described above. By packaging both digital IC die 122 and analog IC die 124 on a single IC package 126, more digital noise may be coupled from the digital IC die to the analog IC die, e.g., via the substrate, through the air, etc. The higher digital noise coupling may degrade the performance of analog IC die 124.

Figure 1C:
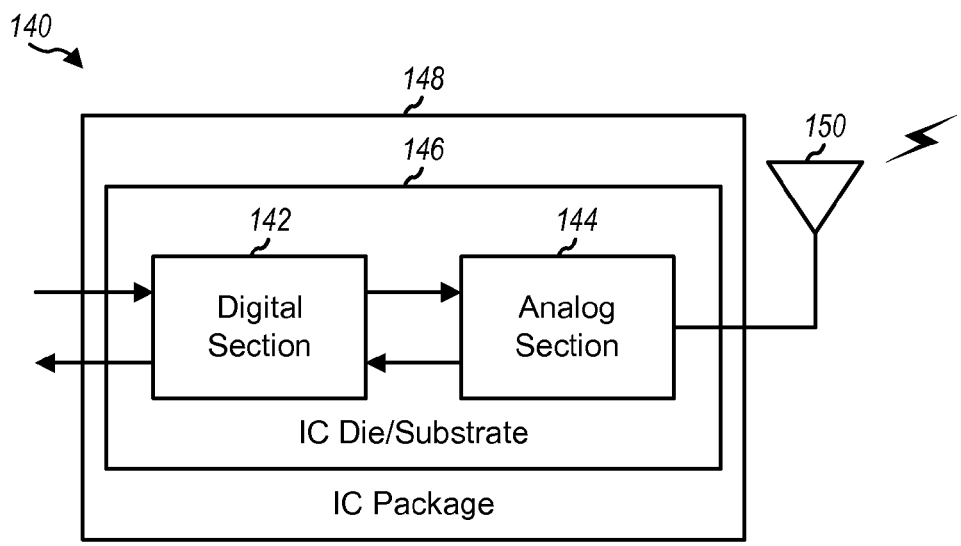

FIG. 1C shows a block diagram of a wireless device 140 with a digital section 142 and an analog section 144 fabricated on a single IC die/substrate 146, which is encapsulated in an IC package 148 and coupled to an antenna 150. Digital section 142 may include digital circuitry that performs the digital processing described above for FIG. 1A. Analog section 144 may include analog circuitry that performs the analog processing described above. Fabricating both digital section 142 and analog section 144 on a single IC die 146 may reduce cost, improve reliability, and/or provide other benefits. However, more digital noise may be coupled from digital section 142 to analog section 144 due to sharing of circuit ground on the same IC substrate, injection of currents from the digital section to the analog section via the substrate, etc. The higher digital noise coupling may degrade the performance of analog section 144.

In general, more digital noise may be coupled from digital circuitry to analog circuitry with higher level of integration. Thus, the digital noise coupling may be worse in wireless device 120 than wireless device 100, and the digital noise coupling may be even worse in wireless device 140 than wireless device 120. The digital noise coupling may be reduced by employing RF isolation techniques. However, this may be a tedious and expensive process that may involve many revisions of the analog section. The techniques described herein may be able to combat the digital noise coupling without having to go through many revisions of the analog section.

Figure 2:
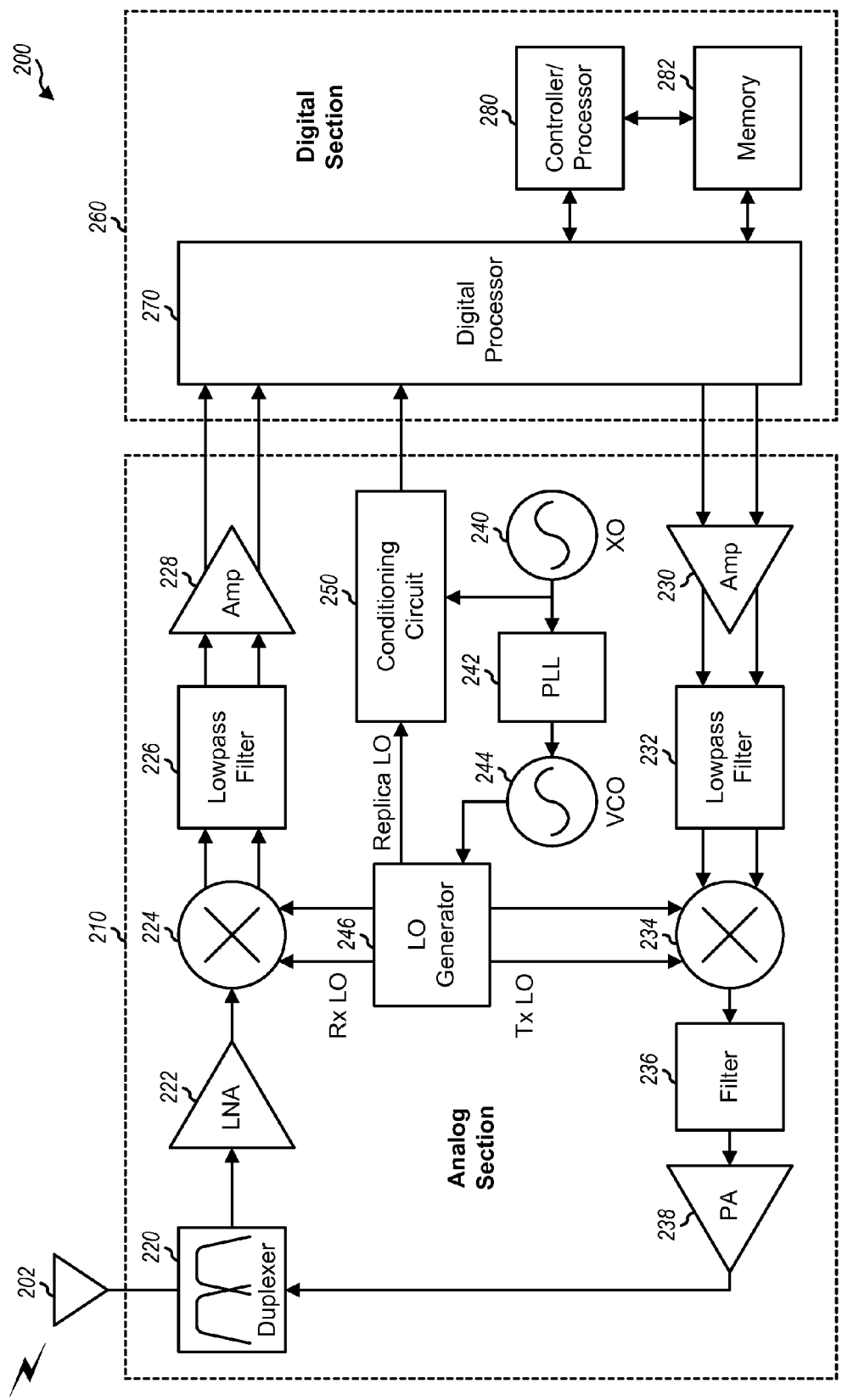
FIG. 2 shows a block diagram of a wireless communication device.

FIG. 2 shows a block diagram of a wireless device 200 that may implement the phase noise mitigation techniques described herein. Wireless device 200 includes an analog section 210 and a digital section 260. Analog section 210 includes a receiver for data reception and a transmitter for data transmission.

In general, the receiver and transmitter may each be implemented with a direct-to-baseband architecture or a super-heterodyne architecture. For a receiver with the direct-to-baseband architecture, a received RF signal is frequency downconverted from RF directly to baseband in one stage. For a receiver with the super-heterodyne architecture, the received RF signal is frequency downconverted in multiple stages, e.g., from RF to an intermediate frequency (IF) in one stage, and then from IF to baseband in another stage. The direct-to-baseband and super-heterodyne architectures may use different circuit blocks and/or have different requirements. The techniques described herein may be used for both the direct-to-baseband and super-heterodyne architectures. For clarity, the direct-to-baseband architecture is described below.

For the receiver, an RF signal is received by an antenna 202 and provided to analog section 210. Within analog section 210, the received RF signal is routed through a duplexer 220, amplified by a low noise amplifier (LNA) 222, and demodulated a mixer 224 to obtain a demodulated signal. The demodulated signal is then filtered by a lowpass filter 226 and amplified by an amplifier (Amp) 228 to obtain an analog input signal, which is provided to digital section 260.

For the transmitter, digital section 260 processes data to be transmitted and provides an analog output signal to analog section 210. Within analog section 210, the analog output signal is amplified by an amplifier 230, filtered by a lowpass filter 232 to remove images caused by the digital-to-analog conversion, and modulated by a mixer 234 to obtain a modulated signal. The modulated signal is further filtered by a bandpass filter 236 to remove images caused by the frequency upconversion, amplified by a power amplifier (PA) 238, routed through duplexer 220, and transmitted via antenna 202.

A crystal oscillator (XO) 240 generates an XO or reference signal having a precise frequency of $f_{xo}$ and good phase noise characteristics. XO 240 may also be a voltage controlled crystal oscillator (VCXO), a temperature compensated crystal oscillator (TCXO), a voltage controlled TCXO (VCTCXO), or some other type of oscillator that can provide a reference signal having good phase noise characteristics.

A voltage controlled oscillator (VCO) 244 generates a VCO signal at a desired frequency. A phase-locked loop (PLL) 242 receives the VCO signal and the XO signal and generates a control signal for VCO 244. PLL 242 locks VCO 244 to XO 240 such that the VCO signal is locked in frequency to the XO signal and has good phase noise characteristics in the absence of excessive digital noise coupling. An LO generator 246 receives the VCO signal and generates a receive (Rx) LO signal used for frequency downconversion by mixer 224 and a transmit (Tx) LO signal used for frequency upconversion by mixer 234. The Rx LO signal is at a frequency of $f_{rx}$ and the Tx LO signal is at a frequency of $f_{tx}$. The Rx and Tx LO signals may have additional phase noise due to digital noise coupling and/or other noise sources.

Although not shown in FIG. 2 for simplicity, one set of VCO, PLL and LO generator may be used to generate the Rx LO signal, and another set of VCO, PLL and LO generator may be used to generate the Tx LO signal. Both sets may use the same XO 240 as the reference frequency. Thus, VCO 244 may comprise an Rx VCO and a Tx VCO, PLL 242 may comprise an Rx PLL and a Tx PLL, and LO generator 246 may comprise an Rx LO generator and a Tx LO generator.

A conditioning circuit 250 may receive from LO generator 246 a replica Rx LO signal having additional phase noise present in the Rx LO signal. Conditioning circuit 250 may then provide to digital section 260 a replica Rx input signal having the additional phase noise. Alternatively or additionally, conditioning circuit 250 may receive from LO generator 246 a replica Tx LO signal having additional phase noise present in the Tx LO signal. Conditioning circuit 250 may then provide to digital section 260 a replica Tx input signal having the additional phase noise.

Within digital section 260, a digital processor 270 may perform various functions such signal conversion between analog and digital, signal processing for data transmission and reception, etc. A controller/processor 280 may direct the operation of various units within digital section 260 and analog section 210. A memory 282 may store data and program codes for digital section 260.

FIG. 2 shows an example design of analog section 210 and digital section 260. In general, for analog section 210, the transmitter and receiver may each include one or more stages of amplifier, filter, and mixer for signal conditioning. The circuit blocks may also be arranged differently from the configuration shown in FIG. 2. Digital section 260 may include other processors, memories, and interface units.

Figure 3A:
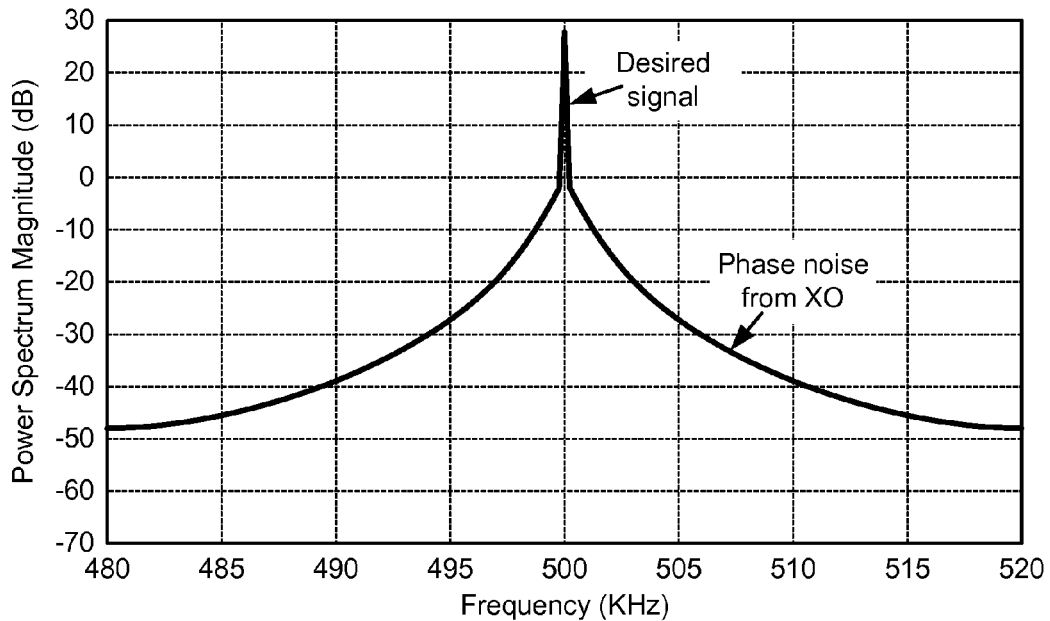
FIGS. 3A and 3B show spectral plots of signals without and with additional phase noise, respectively.

FIG. 3A shows an example spectral plot of the analog input signal from amplifier 228 in FIG. 2 without excessive digital noise coupling, e.g., with digital section 260 powered down. In this example, the received RF signal has a single tone at the Rx LO frequency plus 500 kilo-Hertz (KHz). After frequency downconversion by mixer 224, the analog input signal has a single tone at 500 KHz and phase noise due to XO 240 and VCO 244. Phase noise within the bandwidth of PLL 242 is due to XO 240, and phase noise outside of the bandwidth of PLL 242 is due to VCO 244. The circuits in analog section 210 are typically designed such that the phase noise is sufficiently low and minimally impacts performance.

Figure 3B:
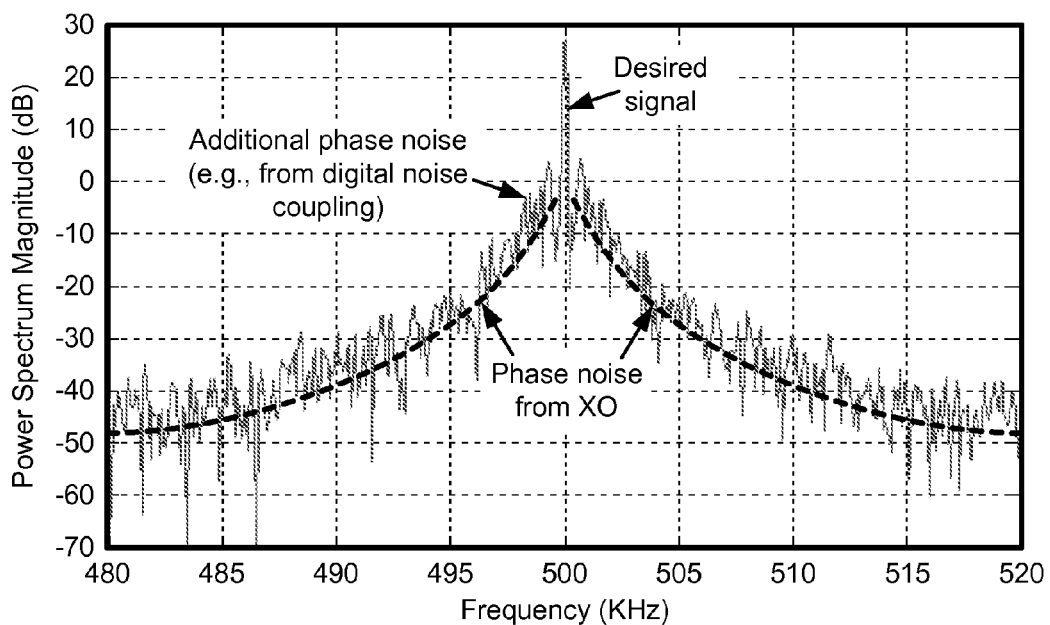

FIG. 3B shows an example spectral plot of the analog input signal from amplifier 228 with high digital noise coupling, e.g., with digital section 260 powered on. The received RF signal has a single tone at the Rx LO frequency plus 500 KHz. After frequency downconversion, the analog input signal has a single tone at 500 KHz, phase noise due to XO 240, and additional phase noise due to the digital noise coupling. The digital noise may couple into VCO 244 and modulate the Rx LO signal. The additional phase noise on the Rx LO signal may result in spurious tones and/or extraneous modulation in the analog input signal, which may adversely impact performance.

In an aspect, additional phase noise in an LO signal may be estimated and removed from a data signal that is frequency converted by the LO signal. This may be achieved by downconverting a replica or copy of the LO signal with a clean reference signal (e.g., using a mixer or an ADC) and deriving an estimate of the additional phase noise. The inverse of the estimated additional phase noise may then be applied to the data signal to mitigate the additional phase noise.

Figure 4:
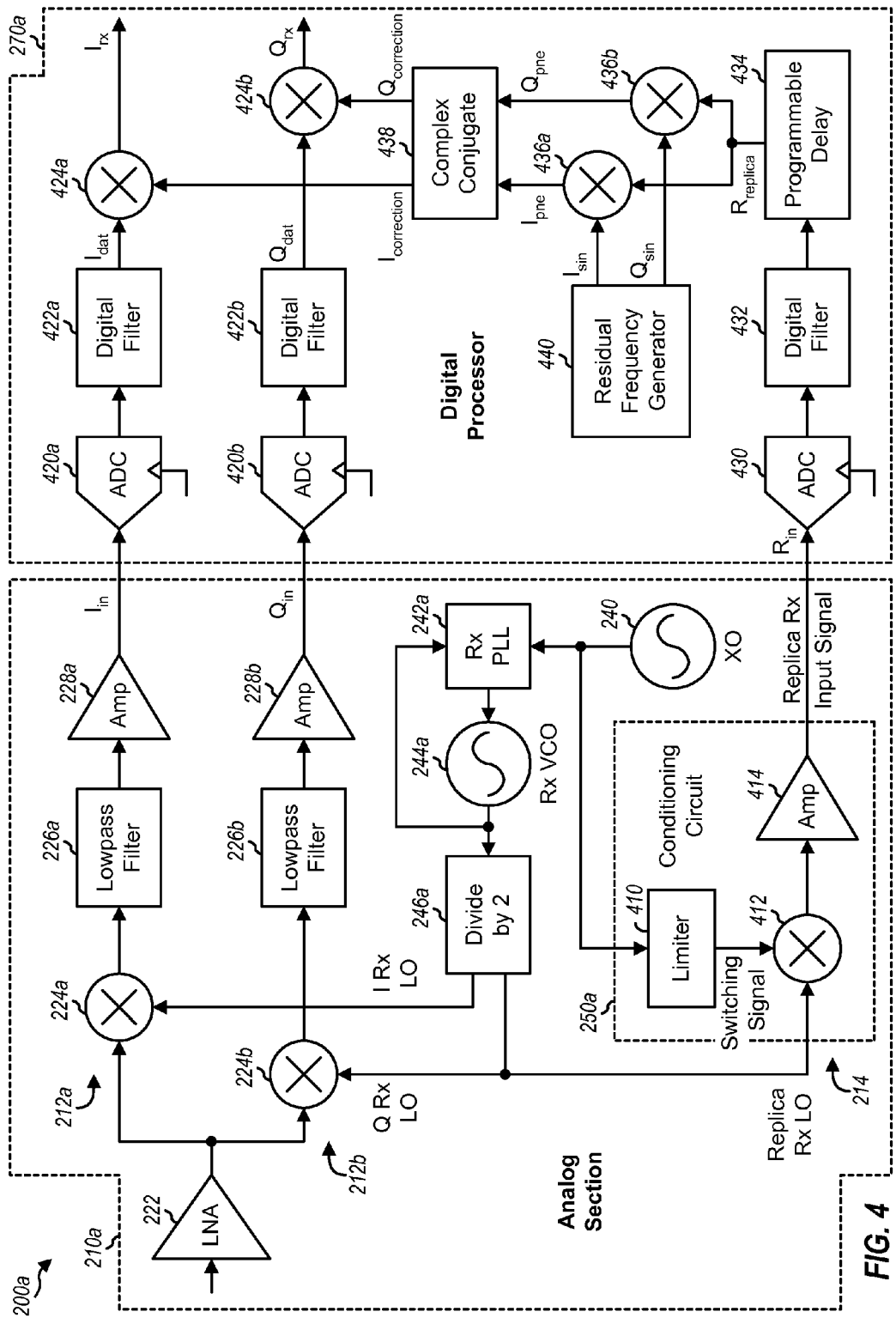
FIG. 4 shows a block diagram of a receiver with phase noise mitigation achieved by downconverting a replica Rx LO signal with a mixer.

FIG. 4 shows a block diagram of a wireless device 200a, which is one design of wireless device 200 in FIG. 2. Wireless device 200a mitigates additional phase noise in the Rx LO signal by downconverting a replica Rx LO signal with a mixer. Wireless device 200a includes an analog section 210a and a digital processor 270a, which are one design of analog section 210 and digital processor 270, respectively, in FIG. 2. Analog section 210a and digital processor 270a include an inphase (I) receive path 212a, a quadrature (Q) receive path 212b, and a replica path 214.

Within analog section 210a, I receive path 212a includes a mixer 224a, a lowpass filter 226a, and an amplifier 228a, and Q receive path 212b includes a mixer 224b, a lowpass filter 226b, and an amplifier 228b. Mixers 224a and 224b correspond to mixer 224 in FIG. 2, lowpass filters 226a and 226b correspond to lowpass filter 226, and amplifiers 228a and 228b correspond to amplifier 228. VCO 244 in FIG. 2 includes an Rx VCO 244a that generates a VCO signal at twice the receive frequency of $f_{rx}$. PLL 242 in FIG. 2 includes an Rx PLL 242a that locks the frequency of Rx VCO 244a to XO 240. LO generator 246 in FIG. 2 includes a divide-by-2 circuit 246a that receives the VCO signal from Rx VCO 244a and divides the VCO signal by two in frequency. Circuit 246a provides an I Rx LO signal to mixer 224a and a Q Rx LO signal to mixer 224b. Although not shown in FIG. 4, the I and Q Rx LO signals may be buffered by amplifiers and then provided to mixers 224a and 224b, respectively. These amplifiers may be used to provide signal gain, isolation, etc.

Within analog section 210a, the amplified RF signal from LNA 222 is downconverted by mixer 224a with the I Rx LO signal, filtered by lowpass filter 226a, and amplified by amplifier 228a to obtain an I input signal, $I_{in}$. The amplified RF signal from LNA 222 is also downconverted by mixer 224b with the Q Rx LO signal, filtered by lowpass filter 226b, and amplified by amplifier 228b to obtain a Q input signal, $Q_{in}$. The I and Q input signals correspond to the analog input signal in FIG. 2 and are provided to digital processor 270a.

Within digital processor 270a, the I input signal is digitized by an analog-to-digital converter (ADC) 420a and filtered by a digital filter 422a to obtain I data samples, $I_{dat}$. The Q input signal is digitized by an ADC 420b and filtered by a digital filter 422b to obtain Q data samples, $Q_{dat}$. A multiplier 424a multiplies the I data samples with an I correction signal, $I_{correction}$, and provides I received samples, $I_{rx}$. A multiplier 424b multiplies the Q data samples with a Q correction signal, $Q_{correction}$, and provides Q received samples, $Q_{rx}$.

For phase noise mitigation, analog section 210a includes a conditioning circuit 250a, which is one design of conditioning circuit 250 in FIG. 2. Within conditioning circuit 250a, a limiter 410 receives the XO signal from XO 240 and generates a switching signal having strong harmonics of the XO frequency $f_{xo}$. Limiter 410 may also be replaced with a multiplier or some other circuit. A mixer 412 receives the Q Rx LO signal as the replica Rx LO signal, mixes the replica Rx LO signal with the switching signal, and provides a downconverted signal. An amplifier 414 amplifies the downconverted signal and provides a replica Rx input signal, $R_{in}$, to digital processor 270a.

Within digital processor 270a, the replica Rx input signal is digitized by an ADC 430 and filtered by a digital filter 432 to obtain a filtered signal having a tone at a residual frequency of $f_{res}$. The residual frequency $f_{res}$ is dependent on the frequency $f_{rx}$ of the replica Rx LO signal and the frequency $f_{xo}$ of the XO signal, as described below. A delay unit 434 provides a programmable delay for the filtered signal such that the I and Q correction signals are time aligned with the I and Q data samples at multipliers 424a and 424b. Delay unit 434 outputs a replica signal, $R_{replica}$, which is derived based on the replica Rx LO signal and thus contains an estimate of the additional phase noise in the Rx LO signal used for frequency downconversion. A residual frequency generator 440 generates I and Q sinusoidal signals, $I_{sin}$ and $Q_{sin}$, at the residual frequency $f_{res}$. A multiplier 436a multiplies the replica signal with the I sinusoidal signal and provides an I phase noise estimate signal, $I_{pne}$. A multiplier 436b multiplies the replica signal with the Q sinusoidal signal and provides a Q phase noise estimate signal, $Q_{pne}$. Multipliers 436a and 436b frequency translate the replica signal from $f_{res}$ down to DC and provides a complex phase noise estimate signal containing an estimate of the additional phase noise in the Rx LO signal. A unit 438 receives the complex phase noise estimate signal and provides the complex conjugate of this signal as the complex correction signal. Unit 438 may simply pass the output of multiplier 436a as the I correction signal and may provide the inverted output of multiplier 436b as the Q correction signal. Unit 438 inverts the phase of the phase noise estimate signal so that the additional phase noise may be removed from the I and Q data samples by multipliers 424a and 424b.

The I and Q data samples, $I_{dat}$ and $Q_{dat}$, contain additional phase noise and may be expressed as:

$$A \cdot e^{j\phi} = A \cdot [\cos(\phi) + j\sin(\phi)], \qquad \text{Eq (1)}$$

where A represents the desired signal and $\phi$ represents the additional phase noise.

The I and Q received samples, $I_{rx}$ and $Q_{rx}$, after removal of the additional phase noise, may be expressed as:

$$\begin{aligned}
A \cdot e^{j\phi} \cdot e^{-j\phi} &= A \cdot [\cos(\phi) + j\sin(\phi)] \cdot [\cos(\phi) - j\sin(\phi)] \qquad \text{Eq (2)}\\
&= A \cdot \begin{bmatrix} \cos^2(\phi) + \\ \sin^2(\phi) \end{bmatrix} + j \cdot A \cdot \begin{bmatrix} \cos(\phi) \cdot \sin(\phi) - \\ \cos(\phi) \cdot \sin(\phi) \end{bmatrix},\\
&= A
\end{aligned}$$

where $e^{-j\phi}$ represents the I and Q correction signals from unit 428. Equation (2) assumes that the additional phase noise can be estimated without errors.

ADCs 420a, 420b and 430 may be implemented with sigma-delta ADCs (ΣΔ ADCs), flash ADCs, successive approximation ADCs, or ADCs of other types. ADCs 420a, 420b and 430 may also be clocked at various sampling rates. ADCs 420a and 420b may be clocked at a sampling rate Of $f_{samp1}$, and ADC 430 may be clocked at a sampling rate Of $f_{samp2}$, which may or may not be equal to $f_{samp1}$. In one design, $f_{samp1}$ is obtained by dividing the receive frequency by an integer ratio R, or $f_{samp1} = f_{rx}/R$. In one design, $f_{samp2}$ is equal to the XO frequency, or $f_{samp2} = f_{xo}$. In another design, $f_{samp2}$ is equal to an integer multiple of the XO frequency, or $f_{samp2} = L \cdot f_{xo}$, where L may be any integer value. A VCO/PLL (not shown in FIG. 4) may generate a sampling clock for ADC 430 or generate a clock signal used to derive the sampling clock. This VCO/PLL may be locked to XO 240. Other sampling rates may also be used for ADCs 420a, 420b and 430.

Figure 5A:
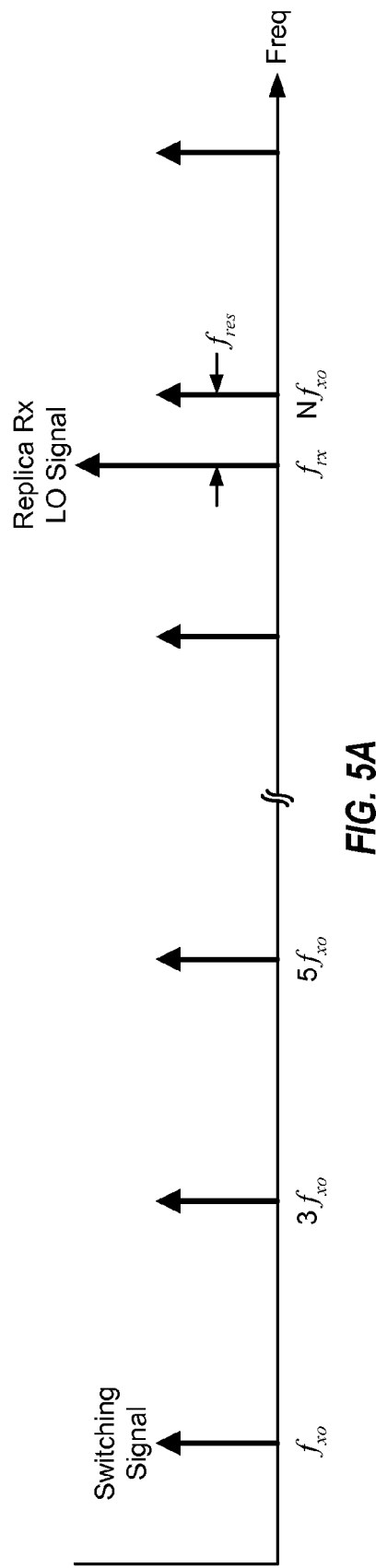
FIG. 5A shows a spectral plot of a switching signal and the replica Rx LO signal.

FIG. 5A shows a spectral plot of the switching signal from limiter 410 and the replica Rx LO signal provided to mixer 412 in FIG. 4. The replica Rx LO signal is at a frequency of $f_{rx}$, which may be dependent on a frequency channel being received by the wireless device. Rx PLL 242a divides the frequency of Rx VCO 244a by a factor of M such that the VCO frequency $f_{vco}$, is twice the desired receive frequency (because of divider 246a). The relationship between $f_{vco}$, $f_{rx}$, $f_{xo}$ and M may be expressed as:

$$M = \frac{f_{vco}}{f_{xo}} = \frac{2f_{rx}}{f_{xo}}. \qquad \text{Eq (3)}$$

Typically, $f_{xo}$ is a fixed frequency, e.g., $f_{xo}$=19.2 megaHertz (MHz) or some other frequency. M may be an integer or non-integer value selected such that the desired receive frequency is obtained.

As shown in FIG. 5A, the switching signal may contain strong harmonics because of sharp edges generated by limiter 410. If the switching signal has 50% duty cycle, then only odd harmonics are present at frequencies of $f_{xo}$, $3f_{xo}$, $5f_{xo}$, etc., as shown in FIG. 5A. A non-symmetric clock with a duty cycle that is not 50% may be used to obtain both odd and even harmonics. The non-symmetric clock may be generated by dividing the XO signal such that the high duration is different from the low duration.

As shown in FIG. 5A, the N-th XO harmonic is closest to the receive frequency, where N may be any odd integer value if the switching signal has 50% duty cycle. The difference between the N-th XO harmonic and the receive frequency is the residual frequency $f_{res}$, which may be expressed as:

$$f_{res}=N\cdot f_{xo}-f_{rx}=(N-M/2)\cdot f_{xo}. \qquad \text{Eq (4)}$$

The second equality in equation (4) is obtained by substituting $f_{rx}$ with $M\cdot f_{xo}/2$, which is obtained from equation (3).

Figure 5B:
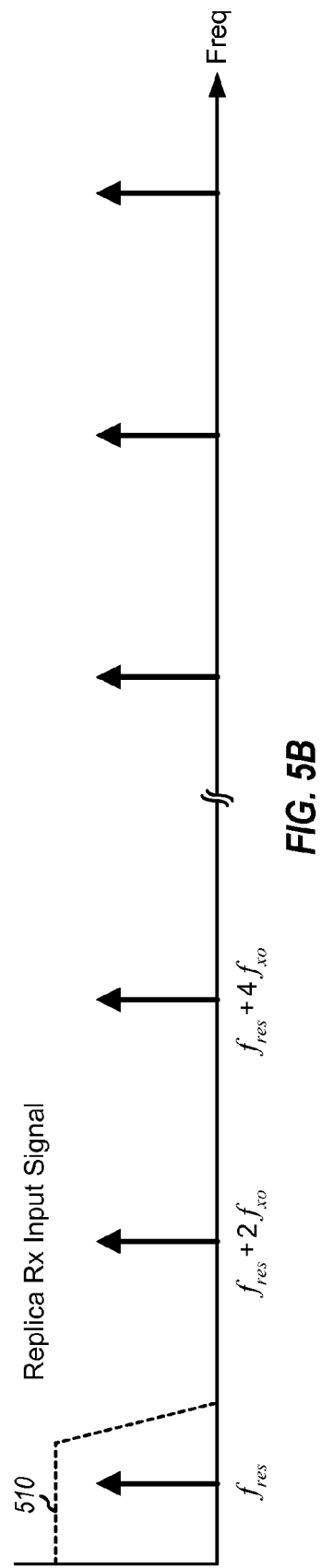
FIG. 5B shows a spectral plot of a replica input signal.

FIG. 5B shows a spectral plot of the replica Rx input signal from amplifier 414 in FIG. 4. The XO harmonics are downconverted with the replica Rx LO signal by mixer 412. The N-th XO harmonic is frequency translated to the residual frequency $f_{res}$. The replica Rx input signal also contains other XO harmonics, which are translated in frequency by the replica Rx LO signal and are spaced apart by $2f_{xo}$.

Referring back to FIG. 4, ADC 430 digitizes the replica Rx input signal at the sampling rate Of $f_{samp2}$. Residual frequency $f_{res}$ may range from 0 to $f_{xo}$ depending on $f_{rx}$. In this case, $f_{samp2}$ may be more than twice $f_{xo}$ in order to capture $f_{res}$ in all cases. The digitization of the replica Rx input signal results in aliasing of the XO harmonics at frequencies higher than $f_{samp2}$. The digitized signal from ADC 430 thus includes multiple tones corresponding to different XO harmonics due to aliasing. Digital filter 432 filters the digitized signal with a suitable response (e.g., a response 510 in FIG. 5B) to extract the XO harmonic at $f_{res}$ and to suppress the aliased XO harmonics at other frequencies. In general, digital filter 432 may have any lowpass or bandpass response such that the XO harmonic or tone at one frequency is passed and the XO harmonics or tones at other frequencies are suppressed. Delay unit 434 provides the replica signal containing mostly the XO harmonic at $f_{res}$.

Residual frequency generator 440 generates the I and Q sinusoidal signals, $I_{sin}$ and $Q_{sin}$, at the residual frequency $f_{res}$, which may be determined based on equation (4). The $I_{sin}$ and $Q_{sin}$ signals are used to frequency translate the XO harmonic at $f_{res}$ down to DC. In general, the frequency of the $I_{sin}$ and $Q_{sin}$ signals is selected such that the I and Q phase noise estimate signals are at the same frequency as the I and Q data samples from digital filters 422a and 422b. This frequency may be DC or a low frequency.

Figure 6:
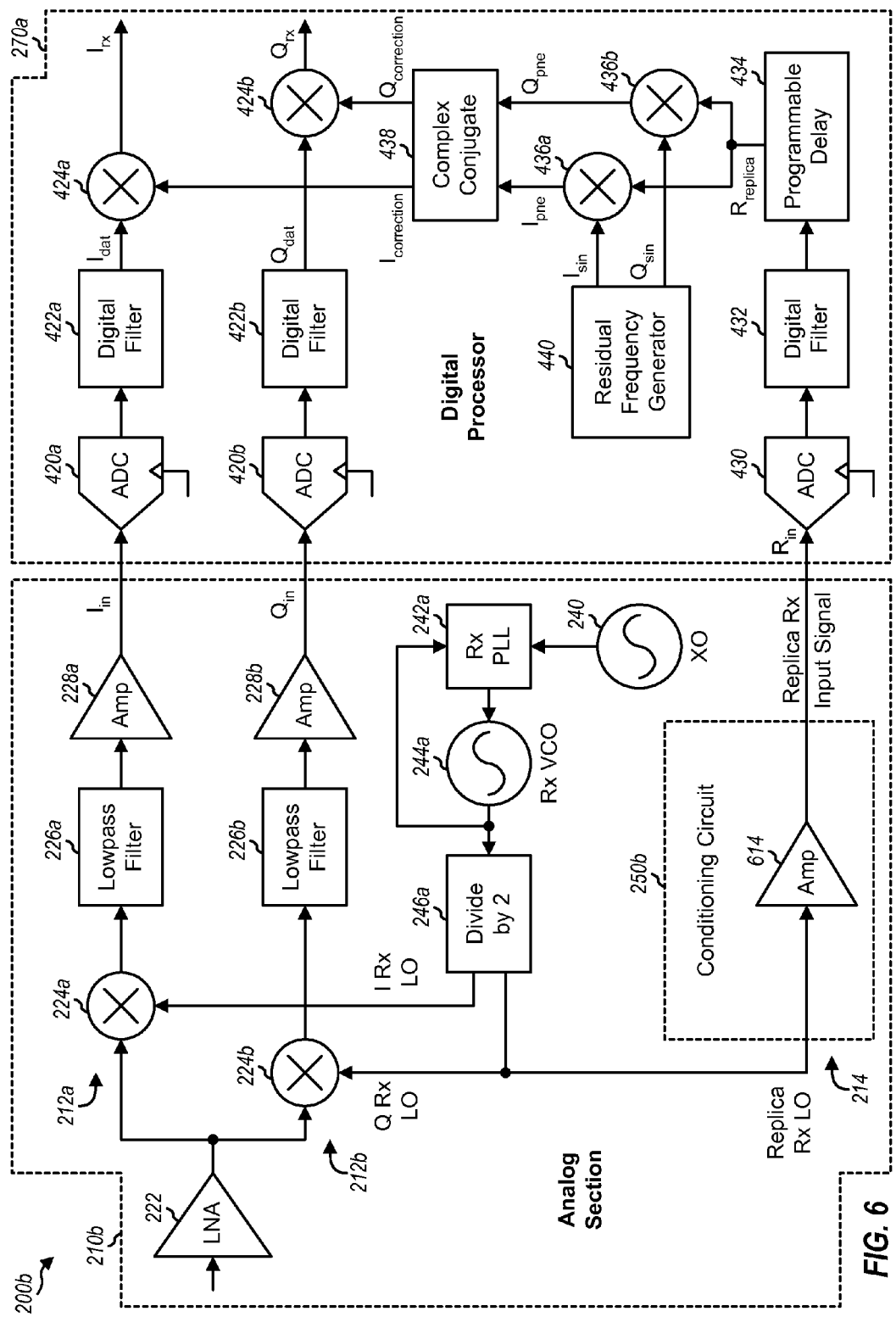
FIG. 6 shows a block diagram of a receiver with phase noise mitigation achieved by digitizing the replica Rx LO signal.

FIG. 6 shows a block diagram of a wireless device 200b, which is another design of wireless device 200 in FIG. 2. Wireless device 200b mitigates additional phase noise in the Rx LO signal by digitizing the replica Rx LO signal without downconversion. Wireless device 200b includes an analog section 210b, which is another design of analog section 210 in FIG. 2. Analog section 200b includes all of the circuit blocks in analog section 200a in FIG. 4 and further includes conditioning circuit 250b in place of conditioning circuit 250a. Within conditioning circuit 250b, an amplifier 614 receives the Q Rx LO signal from divide-by-2 circuit 246a as the replica Rx LO signal, amplifies the replica Rx LO signal, and provides the replica Rx input signal, $R_{in}$, to digital processor 270a.

Within digital processor 270a, ADC 430 digitizes the replica Rx input signal at the sampling rate Of $f_{samp2}$. ADC 430 should have a sufficiently wide input bandwidth so that the replica Rx input signal is not attenuated too much at frequency $f_{rx}$ where most of the signal energy resides. Since $f_{samp2}$ is lower than f, the replica Rx input signal is undersampled. This undersampling results in the replica Rx input signal being aliased to frequencies $f_{resa}$ and $f_{samp2}-f_{resa}$, where $f_{resa}$ is a residual frequency due to the aliasing. The residual frequency $f_{resa}$ is dependent on the receive frequency $f_{rx}$ and the sampling rate $f_{samp2}$ and may be expressed as:

$$f_{resa}=K\cdot f_{samp2}-f_{rx}, \qquad \text{Eq (5)}$$

where K is an integer value corresponding to the K-th harmonic Of $f_{samp2}$ that is closest to $f_{rx}$.

In the design shown in FIG. 4, an XO harmonic is downconverted by mixer 412 to frequency $f_{res}$, which is not dependent on the sampling rate $f_{samp2}$ for ADC 430. In the design shown in FIG. 6, an XO harmonic is aliased by ADC 430 to frequency $f_{resa}$, which is dependent on the sampling rate $f_{samp2}$ for ADC 430. In FIG. 6, if the sampling rate is selected as $f_{samp2}=f_{xo}$, then $f_{resa}=f_{res}$ and may be determined as shown in equation (4). If the sampling rate is not $f_{xo}$ then $f_{resa}$ may be determined as shown in equation (5).

Digital filter 432 filters the digitized signal from ADC 430 to extract the tone at $f_{resa}$. Residual frequency generator 440 generates I and Q sinusoidal signals at the residual frequency $f_{resa}$. Multipliers 436a and 436b multiply the replica signal from delay unit 434 with the I and Q sinusoidal signals, respectively, and provide I and Q phase noise estimate signals at DC.

FIGS. 4 and 6 show two designs for generating a complex phase noise estimate signal that may be used for phase noise mitigation. In general, a replica Rx LO signal with additional phase noise may be downconverted by (a) a mixer with a clean reference signal, e.g., as shown in FIG. 4, (b) an ADC with a clean sampling clock through aliasing, e.g., as shown in FIG. 6, or (c) other circuits in other manners. The replica signal at the residual frequency may be frequency translated in the digital domain to obtain the complex phase noise estimate signal at DC.

As shown in FIGS. 4 and 6, the I and Q receive paths may include different circuit blocks than those in the replica path. Hence, the I and Q data samples from digital filters 422a and 422b may observe different delay than the delay observed by the I and Q correction signals from unit 438. In general, a programmable delay may be provided in the receive paths (e.g., via digital filters 422a and 422b) or in the replica path (e.g., via digital filter 432 or delay unit 434) such that the I and Q correction signals are time aligned with the I and Q data samples. This would ensure that the additional phase noise in the I and Q data samples may be reduced with the I and Q correction signals. An appropriate delay may be determined by evaluating performance with different possible delays and selecting the delay with the best performance, e.g., the lowest packet error rate (PER).

Figure 7:
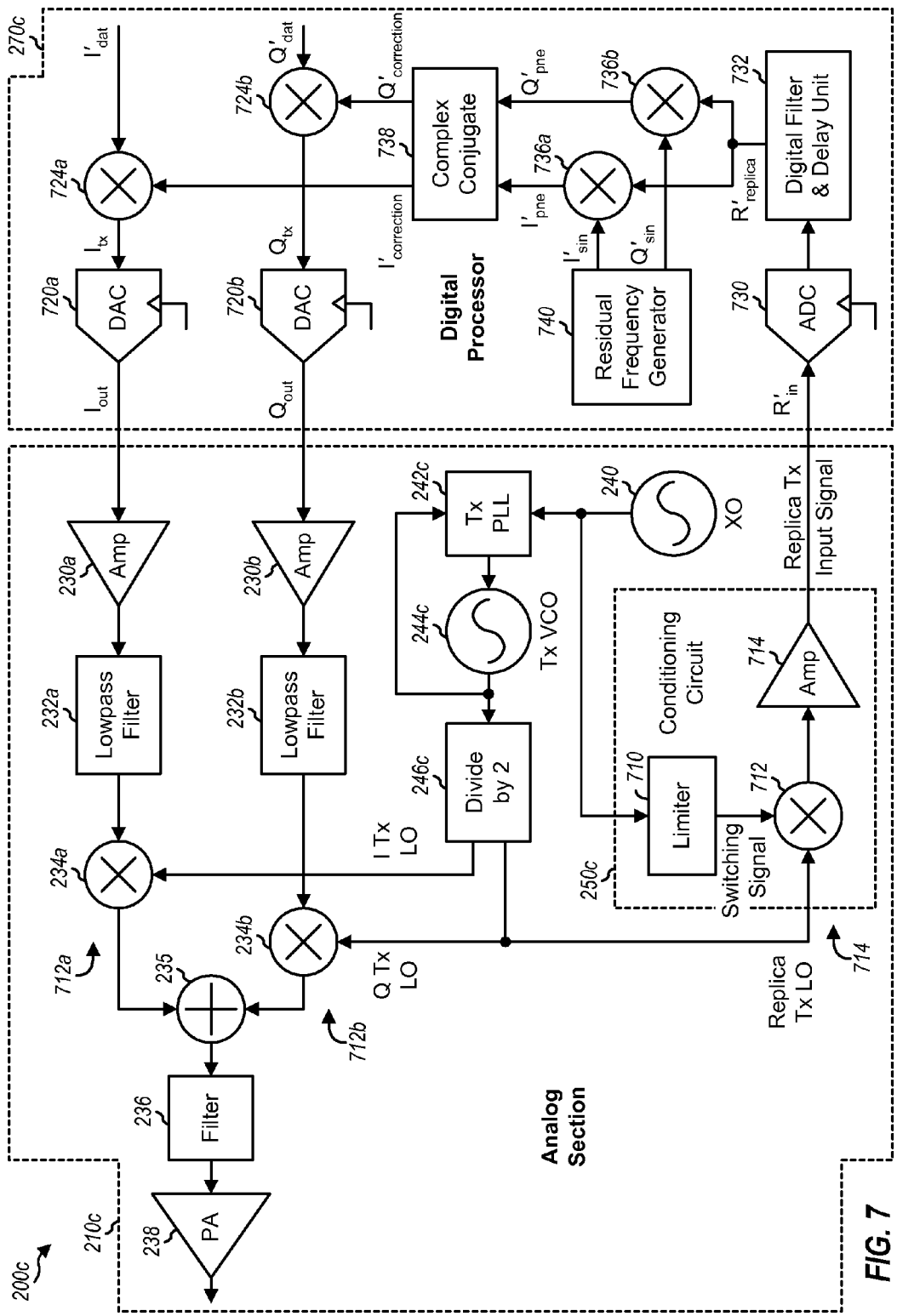
FIG. 7 shows a block diagram of a transmitter with phase noise mitigation.

FIG. 7 shows a block diagram of a wireless device 200c, which is yet another design of wireless device 200 in FIG. 2. Wireless device 200c mitigates additional phase noise in the Tx LO signal by downconverting a replica Tx LO signal with a mixer. Wireless device 200c includes an analog section 210c and a digital processor 270c, which are another design of analog section 210 and digital processor 270, respectively, in FIG. 2. Analog section 210c and digital processor 270c include an I transmit path 712a, a Q transmit path 712b, and a replica path 714.

Within digital processor 270c, a multiplier 724a multiplies I data samples, I'$_{dat}$, with an I correction signal, I'$_{correction}$, and provides I transmit samples, I$_{tx}$. A multiplier 724b multiplies Q data samples, Q'$_{dat}$, with a Q correction signal, Q'$_{correction}$, and provides Q transmit samples, Q$_{tx}$. A digital-to-analog converter (DAC) 720a converts the I transmit samples to analog and provides an I output signal, I$_{out}$. A DAC 720b converts the Q transmit samples to analog and provides a Q output signal, Q$_{out}$.

Within analog section 210c, the I output signal is amplified by an amplifier 230a, filtered by a lowpass filter 232a, and upconverted by a mixer 234a with an I Tx LO signal. The Q output signal is amplified by an amplifier 230b, filtered by a lowpass filter 232b, and upconverted by a mixer 234b with a Q Tx LO signal. The outputs of mixers 234a and 234b are summed by a summer 235, filtered by filter 236, and amplified by power amplifier 238 to generate the transmit RF signal. Amplifiers 230a and 230b correspond to amplifier 230 in FIG. 2, lowpass filters 232a and 232b correspond to lowpass filter 232, and mixers 234a and 234b and summer 235 correspond to mixer 234.

VCO 244 in FIG. 2 includes a Tx VCO 244c that generates a VCO signal at twice the transmit frequency of f$_{tx}$. PLL 242 in FIG. 2 includes a Tx PLL 242c that locks the frequency of Tx VCO 244c to XO 240. LO generator 246 in FIG. 2 includes a divide-by-2 circuit 246c that receives the VCO signal from Tx VCO 244c and divides the VCO signal by two in frequency. Circuit 246c provides the I Tx LO signal to mixer 234a and the Q Tx LO signal to mixer 234b. Although not shown in FIG. 7, the I and Q Tx LO signals may be buffered by amplifiers and then provided to mixers 234a and 234b, respectively. The I and Q Tx LO signals may also be generated in other manners, e.g., by mixing the I and Q Rx LO signals with an LO signal at a frequency of f$_{rx}$−f$_{tx}$.

For phase noise mitigation, analog section 210c includes a conditioning circuit 250c having a limiter 710, a mixer 712, and an amplifier 714 that operate as described above for limiter 410, mixer 412, and amplifier 414 in FIG. 4. Mixer 712 receives the Q Tx LO signal from circuit 246c as the replica Tx LO signal, mixes the replica Tx LO signal with the switching signal from limiter 710, and provides a downconverted signal. Amplifier 714 amplifies the downconverted signal and provides the replica Tx input signal, R'$_{in}$.

Within digital processor 270c, the replica Tx input signal is digitized by an ADC 730 and filtered and delayed by a digital filter and delay unit 732 to obtain a replica signal, R'$_{replica}$, having a tone at a residual frequency of f'$_{res}$. The residual frequency f'$_{res}$ is dependent on the frequency f$_{tx}$ of the replica Tx LO signal and the frequency f$_{xo}$ of the XO signal from XO 240, e.g., as shown in equation (4) albeit with f$_{rx}$ replaced with f$_{tx}$. A residual frequency generator 740 generates I and Q sinusoidal signals, I'$_{sin}$ and Q'$_{sin}$, at the residual frequency f'$_{res}$. A multiplier 736a multiplies the replica signal with the I'$_{sin}$ signal and provides an I phase noise estimate signal, I'$_{pne}$.

A multiplier 736b multiplies the replica signal with the Q'$_{in}$ signal and provides a Q phase noise estimate signal, Q'$_{pne}$. A unit 738 provides the complex conjugate of the I and Q phase noise estimate signals as the I and Q correction signals to multipliers 724a and 724b, respectively.

For clarity, several designs for estimating additional phase noise in LO signals have been described. The additional phase noise may also be estimated in other manners using other circuits. The correction signals may also be applied on data signals different from those shown in FIGS. 4, 6 and 7.

FIG. 8 shows a process 800 for mitigating additional phase noise in a receiver or a transmitter. A correction signal having an estimate of additional phase noise in an LO signal used for frequency conversion (e.g., downconversion or upconversion) of a data signal is derived (block 810). The correction signal is applied to the data signal to mitigate the additional phase noise (block 820). For phase noise mitigation in a receiver, a received signal may be downconverted or demodulated with the LO signal to obtain a demodulated signal from which the data signal is derived. The data signal may then be multiplied with the correction signal to reduce the additional phase noise in the data signal. For phase noise mitigation in a transmitter, the data signal may be upconverted or modulated with the LO signal to generate a modulated signal. The data signal may be multiplied with the correction signal to reduce the additional phase noise in the modulated signal.

Block 810 may be performed by a first circuit, which may include a complex multiplier composed of multipliers 436a and 436b in FIG. 4, complex conjugate unit 438, and/or other units. Block 820 may be performed by a second circuit, which may include a complex multiplier composed of multipliers 424a and 424b. Blocks 810 and 820 may also be performed by a processor or some other electronics unit.

FIG. 9 shows a process 810a for deriving the correction signal used to mitigate additional phase noise. Process 810a may be used for block 810 in FIG. 8. A replica LO signal having additional phase noise may be downconverted with a switching signal to obtain a downconverted signal (block 912). The switching signal may be generated by limiting a reference signal (e.g., an XO signal), by multiplying up the reference signal, etc. An input signal having the additional phase noise may be derived based on the downconverted signal (e.g., as shown in FIGS. 4 and 7) or based on the replica LO signal without downconversion (e.g., as shown in FIG. 6) (block 914).

The input signal may be digitized to obtain a digitized signal having a plurality of tones due to aliasing (block 916). The digitization may be at a sampling rate that is an integer multiple of the frequency of the reference signal. The digitized signal may be filtered to pass one of the plurality of tones and to suppress the remaining tones (block 918). A replica signal having the additional phase noise may be derived based on the filtered signal (block 920). The replica signal may be the filtered signal, a delayed version of the filtered signal to time align the correction signal with the data signal, etc. The replica signal may be frequency translated with a sinusoidal signal or some other periodic signal to obtain a phase noise estimate signal (block 922). The frequency of the sinusoidal signal may be determined based on the frequency of the replica LO signal and the frequency of the reference signal or the sampling rate, e.g., as shown in equation (4) or (5). A complex conjugate of the phase noise estimate signal may be provided as the correction signal (block 924).

The phase noise mitigation techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, Orthogonal Frequency Division Multiplexing (OFDM) systems, multiple-input multiple-output (MIMO) systems, wireless local area networks (WLANs) and other systems that transmit modulated data. A CDMA system may implement a radio technology such as cdma2000, Wideband-CDMA (W-CDMA), etc. cdma2000 covers IS-95, IS-2000, and IS-856 standards. A TDMA system may implement a radio technology such as Global System for Mobile Communications (GSM), Digital Advanced Mobile Phone System (D-AMPS), etc. These various radio technologies and standards are known in the art.

The techniques may also be used for various frequency bands such as, for example, a cellular band from 824 to 894 MHz, a Personal Communication System (PCS) band from 1850 to 1990 MHz, a Digital Cellular System (DCS) band from 1710 to 1880 MHz, an International Mobile Telecommunications-2000 (IMT-2000) band from 1920 to 2170 MHz, etc.

The techniques described herein may be implemented by various means, e.g., in hardware, firmware, software, or a combination thereof. For a hardware implementation, the circuit blocks used for phase noise mitigation may be implemented within one or more ICs, RF ICs, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The circuit blocks may also be fabricated with various IC process technologies such as complementary metal oxide semiconductor (CMOS), N-channel MOS (N-MOS), P-channel MOS (P-MOS), bipolar junction transistor (BJT), bipolar-CMOS (BiCMOS), silicon germanium (SiGe), gallium arsenide (GaAs), etc.

Certain aspects of the techniques may be implemented with firmware and/or software (e.g., procedures, functions, etc.) that perform the functions described herein. The firmware and/or software codes may be stored in a memory (e.g., memory 282 in FIG. 2) and executed by a processor (e.g., processor 270 or 280). The memory may be implemented within the processor or external to the processor.

An apparatus implementing the techniques described herein may be a stand-alone unit or may be part of a device. The device may be (i) a stand-alone IC, (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a first circuit to derive a correction signal having an estimate of additional phase noise in a local oscillator (LO) signal used for frequency conversion of a data signal; and
a second circuit to apply the correction signal to the data signal to mitigate the additional phase noise;
wherein the first circuit comprises:
a multiplier to frequency translate a replica signal having the additional phase noise to obtain a phase noise estimate signal; and
a unit to provide a complex conjugate of the phase noise estimate signal as the correction signal.

2. The apparatus of claim 1, wherein the data signal is obtained by frequency downconversion with the LO signal, and wherein the second circuit multiplies the data signal with the correction signal to reduce the additional phase noise in the data signal.

3. The apparatus of claim 1, wherein the data signal is frequency upconverted with the LO signal to generate a modulated signal, and wherein the second circuit multiplies the data signal with the correction signal to reduce the additional phase noise in the modulated signal.

4. The apparatus of claim 1, wherein the second circuit comprises a multiplier to multiply the data signal with the correction signal.

5. The apparatus of claim 1, further comprising:
a delay unit to provide a delay to time align the correction signal with the data signal.

6. The apparatus of claim 1, further comprising:
a third circuit to provide a sinusoidal signal used to frequency translate the replica signal.

7. The apparatus of claim 6, wherein the third circuit determines frequency of the sinusoidal signal based on frequency of the LO signal and frequency of a reference signal used to generate the replica signal.

8. An integrated circuit comprising:
a processor to derive a correction signal having an estimate of additional phase noise in a local oscillator (LO) signal used for frequency conversion of a data signal and to apply the correction signal to the data signal to mitigate the additional phase noise; and
a memory coupled to the processor, wherein the processor frequency translates a replica signal having the additional phase noise to obtain a phase noise estimate signal and derives the correction signal based on a complex conjugate of the phase noise estimate signal.

9. The integrated circuit of claim 8, wherein the processor obtains a digitized signal having the additional phase noise and a plurality of tones, filters the digitized signal to pass one of the plurality of tones and to suppress remaining ones of the plurality of tones, and derives the correction signal based on a filtered signal.

10. An apparatus comprising:
a first circuit to derive a correction signal having an estimate of additional phase noise in a local oscillator (LO) signal used for frequency conversion of a data signal;
a second circuit to apply the correction signal to the data signal to mitigate the additional phase noise;
an analog-to-digital converter (ADC) to digitize an input signal having the additional phase noise and provide a digitized signal;
a digital filter to filter the digitized signal and provide a filtered signal used to derive the correction signal; and
a mixer to downconvert a replica LO signal with a switching signal, wherein the input signal for the ADC is derived based on an output of the mixer.

11. The apparatus of claim 10, further comprising:
a limiter to receive a reference signal and generate the switching signal for the mixer.

12. The apparatus of claim 10, further comprising:
a crystal oscillator to generate a reference signal used to derive the switching signal for the mixer.

13. The apparatus of claim 12, wherein the ADC is clocked at a sampling rate that is an integer multiple of frequency of the reference signal.

14. An apparatus comprising:
a first circuit to derive a correction signal having an estimate of additional phase noise in a local oscillator (LO) signal used for frequency conversion of a data signal;
a second circuit to apply the correction signal to the data signal to mitigate the additional phase noise;
an analog-to-digital converter (ADC) to digitize an input signal having the additional phase noise and provide a digitized signal; and
a digital filter to filter the digitized signal and provide a filtered signal used to derive the correction signal,
wherein the input signal for the ADC is derived based on a replica LO signal without downconversion, and wherein the ADC downconverts the replica LO signal via aliasing.

15. An apparatus comprising:
a first circuit to derive a correction signal having an estimate of additional phase noise in a local oscillator (LO) signal used for frequency conversion of a data signal;
a second circuit to apply the correction signal to the data signal to mitigate the additional phase noise;
an analog-to-digital converter (ADC) to digitize an input signal having the additional phase noise and provide a digitized signal; and
a digital filter to filter the digitized signal and provide a filtered signal used to derive the correction signal,
wherein the digitized signal includes a plurality of tones, and wherein the digital filter filters the digitized signal to pass one of the plurality of tones and to suppress remaining ones of the plurality of tones.

16. A method comprising:
deriving a correction signal having an estimate of additional phase noise in a local oscillator (LO) signal used for frequency conversion of a data signal; and
applying the correction signal to the data signal to mitigate the additional phase noise, wherein the deriving the correction signal comprises:
frequency translating a replica signal having the additional phase noise to obtain a phase noise estimate signal; and
providing a complex conjugate of the phase noise estimate signal as the correction signal.

17. The apparatus of claim 16, further comprising:
downconverting a received signal with the LO signal to obtain a demodulated signal used to derive the data signal, and wherein the applying the correction signal comprises multiplying the data signal with the correction signal to reduce the additional phase noise in the data signal.

18. The apparatus of claim 16, further comprising:
upconverting the data signal with the LO signal to generate a modulated signal, and wherein the applying the correction signal comprises
multiplying the data signal with the correction signal to reduce the additional phase noise in the modulated signal.

19. A method comprising:
deriving a correction signal having an estimate of additional phase noise in a local oscillator (LO) signal used for frequency conversion of a data signal;
applying the correction signal to the data signal to mitigate the additional phase noise;
digitizing an input signal having the additional phase noise to obtain a digitized signal;
filtering the digitized signal to obtain a filtered signal used to derive the correction signal; and
downconverting a replica LO signal to obtain a downconverted signal used to derive the input signal.

20. A method comprising:
deriving a correction signal having an estimate of additional phase noise in a local oscillator (LO) signal used for frequency conversion of a data signal;
applying the correction signal to the data signal to mitigate the additional phase noise;
digitizing an input signal having the additional phase noise to obtain a digitized signal; and
filtering the digitized signal to obtain a filtered signal used to derive the correction signal, wherein the input signal is derived based on a replica LO signal without downconversion, and wherein the digitization downconverts the replica LO signal via aliasing.

21. A method comprising:
deriving a correction signal having an estimate of additional phase noise in a local oscillator (LO) signal used for frequency conversion of a data signal;
applying the correction signal to the data signal to mitigate the additional phase noise;
digitizing an input signal having the additional phase noise to obtain a digitized signal; and
filtering the digitized signal to obtain a filtered signal used to derive the correction signal, wherein the filtering the digitized signal comprises filtering the digitized signal to pass one of a plurality of tones in the digitized signal and to suppress remaining ones of the plurality of tones.

22. An apparatus comprising
means for deriving a correction signal having an estimate of additional phase noise in a local oscillator (LO) signal used for frequency conversion of a data signal; and
means for applying the correction signal to the data signal to mitigate the additional phase noise,
wherein means for deriving the correction signal comprises:
means for frequency translating a replica signal having the additional phase noise to obtain a phase noise estimate signal; and
means for providing a complex conjugate of the phase noise estimate signal as the correction signal.

23. The apparatus of claim 22, further comprising:
means for downconverting a received signal with the LO signal to obtain a demodulated signal used to derive the data signal, and wherein the means for applying the correction signal comprises means for multiplying the data signal with the correction signal to reduce the additional phase noise in the data signal.

24. The apparatus of claim 22, further comprising:
means for upconverting the data signal with the LO signal to generate a modulated signal, and wherein the means for applying the correction signal comprises means for multiplying the data signal with the correction signal to reduce the additional phase noise in the modulated signal.

25. An apparatus comprising:
means for deriving a correction signal having an estimate of additional phase noise in a local oscillator (LO) signal used for frequency conversion of a data signal;
means for applying the correction signal to the data signal to mitigate the additional phase noise;

means for digitizing an input signal having the additional phase noise to obtain a digitized signal;

means for filtering the digitized signal to obtain a filtered signal used to derive the correction signal; and means for downconverting a replica LO signal to obtain a downconverted signal used to derive the input signal.

26. An apparatus comprising:

means for deriving a correction signal having an estimate of additional phase noise in a local oscillator (LO) signal used for frequency conversion of a data signal;

means for applying the correction signal to the data signal to mitigate the additional phase noise;

means for digitizing an input signal having the additional phase noise to obtain a digitized signal;

means for filtering the digitized signal to obtain a filtered signal used to derive the correction signal; and wherein the input signal is derived based on a replica LO signal without downconversion, and wherein the means for digitizing downconverts the replica LO signal via aliasing.

27. An apparatus comprising:

means for deriving a correction signal having an estimate of additional phase noise in a local oscillator (LO) signal used for frequency conversion of a data signal;

means for applying the correction signal to the data signal to mitigate the additional phase noise;

means for digitizing an input signal having the additional phase noise to obtain a digitized signal; and means for filtering the digitized signal to obtain a filtered signal used to derive the correction signal, wherein the means for filtering the digitized signal comprises means for filtering the digitized signal to pass one of a plurality of tones in the digitized signal and to suppress remaining ones of the plurality of tones.

* * * * *